March 21, 1939.  D. R. MATTOON  2,151,276
HANDLE FOR COOKING UTENSILS
Original Filed Oct. 22, 1937
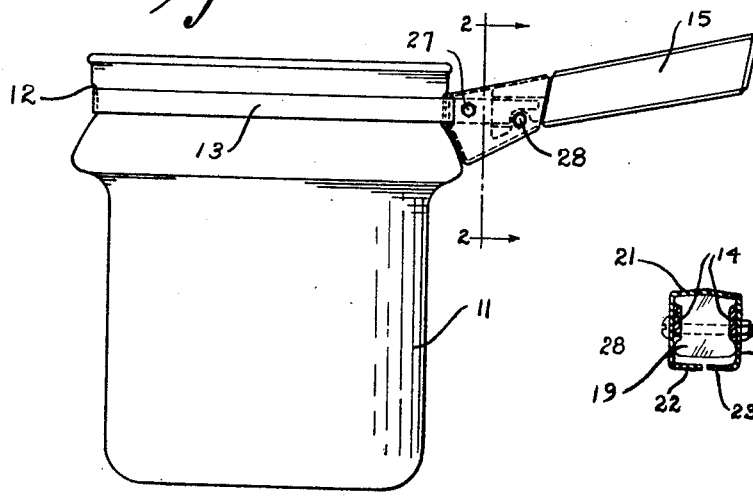
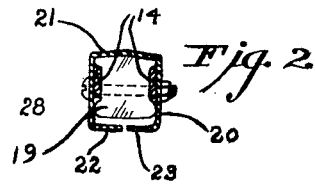
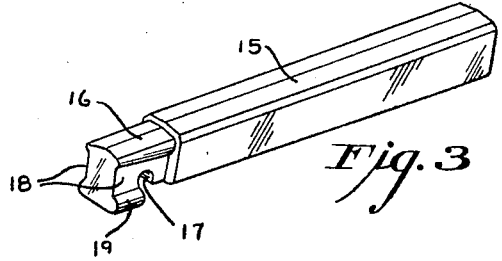
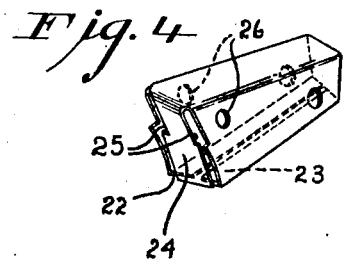
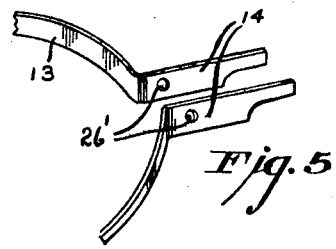
Inventor
DUO R. MATTOON
Dorsey, Cole & Tarna
Attorney Patented Mar. 21, 1939

2,151,276

UNITED STATES PATENT OFFICE 2,151,276

HANDLE FOR COOKING UTENSILS

Deo R. Mattoon, Corning, N. Y., assignor to Corning Glass Works, Corning, N. Y., a corporation of New York Original application October 22, 1937, Serial No. 170,473. Divided and this application August 25, 1938, Serial No. 226,810

4 Claims. (Cl. 16—116)

This invention relates to handles for cooking vessels and more particularly to a handle which may be attached to non-metallic vessels such as glass, earthenware, and the like.

The object of the invention is an improved mounting by which a handle is firmly attached to the vessel with which it cooperates.

Such a handle and mounting are shown in the accompanying drawing in which:

Fig. 1 is an elevation of the handle and mounting assembled upon a vessel;

Fig. 2 is a section through the mounting and handle taken on line 2—2 of Fig. 1;

Fig. 3 is a perspective view of the handle;

Fig. 4 is a perspective view of the clamp; and

Fig. 5 is a perspective view of the ends of the supporting strap.

For purposes of illustration, the improved handle and mounting have been shown in cooperation with a glass cooking vessel designed for use on the top of a stove although obviously such a handle may be used advantageously with other articles of glass, earthenware or even metal.

It has long been known that glass is a relatively poor conductor of heat. This property and the fact that it is non-combustible tend to make it an ideal material from which to construct handles for cooking vessels, but for the fact that it has relatively little strength in tension and it is difficult to secure a glass handle to other than a glass vessel. By suitable processing, a molded glass handle of moderate dimensions may be given ample strength to withstand the stresses encountered in lifting full cooking utensils, and the thermal and mechanical shocks which such utensils encounter in normal service and the structure of the present invention has been found to be particularly strong and well adapted to secure such a handle to any form of vessel.

In the drawing, the cooking utensil 11 is so shaped as to provide a shallow groove 12 in its outer surface adjacent the rim of the utensil. A metal strap 13 encircles the utensil in this groove and terminates in a pair of parallel lugs 14 which extend outwardly, substantially at right angles to the surface of the utensil. The handle 15 terminates in a reduced end 16 which includes a notch 17 cut into the lower surface. Channels 18 are formed into the side walls of end 16 to approximately the thickness of the strap lugs 14 leaving shoulders 19 which extend outwardly above and beneath the lugs.

A sheet metal clamp is provided to enclose lugs 14 and handle end 16 and hold them rigidly in cooperating relationship. This clamp may be stamped from a single piece of metal in such manner as to form a pair of side walls 20 and an integral connecting top web 21. Flanges 22 and 23 on the side walls close the bottom of the clamp while a tongue 24 extending from one end of the top member closes the end of the clamp adjacent the utensil. The edges of this tongue are notched at 25 to provide openings through which lugs 14 may extend into the body of the clamp. Holes 26 in the side walls 20 are in register with corresponding holes 26' in the lugs 14. The clamp member as a whole is contoured to conform substantially to the surface of the handle end 16 and to the surface of the utensil which it abuts.

When the various parts are assembled, the end of the handle fits snugly within the clamp and is held there by a bolt 28 which passes through the clamp and engages in the notch 17 on the lower side of the handle. Lugs 14 of the strap pass through notches in the clamp and fit into the channels 18 in either side of the handle as shown in Fig. 2. The clamping action of walls 20 drawn together by bolt 28 is sufficient to prevent movement of lugs 14 with respect to the handle while bolt 27 passing through holes 26 and 26' rigidly secures the strap to the clamping member and tends to clamp lugs 14 against the sides of the handle. It will be noted that this arrangement of parts results in the application of lifting force to the clamping member by contact of the end 16 with web 21 and also to the ends of the strap which encircles the utensil through the action of shoulders 19 on lugs 14. Such a structure is usually rigid and the distortion of parts in service is reduced to a minimum.

This application is a division of my co-pending application Serial Number 170,473, filed October 22, 1937.

I claim:

1. In a handle structure for a cooking utensil, a metallic strap encircling the utensil and terminating in lugs extending outwardly from the surface of the utensil, a handle having channels formed in one end thereof adapted to receive said lugs, and clamping means enclosing said lugs and a portion of said handle and clamping them together.

2. In a handle structure for a cooking utensil, a metallic strap encircling the utensil and terminating in lugs extending outwardly from the surface of the utensil, a handle having channels formed in one end thereof adapted to receive said lugs, and clamping means enclosing said lugs and a portion of said handle and clamping them together, said clamping means comprising a hollow sheet metal body having openings in the walls thereof to receive the strap lugs and handle end, and holding means passing through said body, one of said holding means preventing relative movement of the lugs and metal body, and the other holding means engaging in a notch in said handle and preventing its withdrawal from the hollow body.

3. In a handle structure for a cooking utensil, a metal strap encircling the utensil and terminating in lugs extending outwardly from the surface thereof, a handle member positioned with one end between said lugs and having a pair of shoulders extending laterally beneath said lugs, a second pair of shoulders extending laterally above said lugs and clamping means enclosing said lugs and handle end and maintaining said lugs in position, whereby an upward force may be exerted on said lugs by the shoulders extending beneath said lugs.

4. In a handle structure for a cooking utensil, a metallic strap encircling the utensil and terminating in lugs extending outwardly from the surface of the utensil, a handle having channels formed in one end thereof to receive said lugs, and clamping means enclosing said lugs and a portion of said handle and clamping them together, said clamping means having openings in its end walls to receive the strap lugs and handle end, and means extending transversely of the clamping means to prevent longitudinal movement of the lugs relative to the handle.

DEO R. MATTOON.